March 14, 1961 C. R. MOREHOUSE ET AL 2,974,802
DISCHARGE BLADES FOR ROTARY FILTERS
Filed Nov. 12, 1958 4 Sheets-Sheet 1

INVENTORS
Charles R. Morehouse
Julian B. Booth, Jr.
BY
Richard Church
ATTORNEY

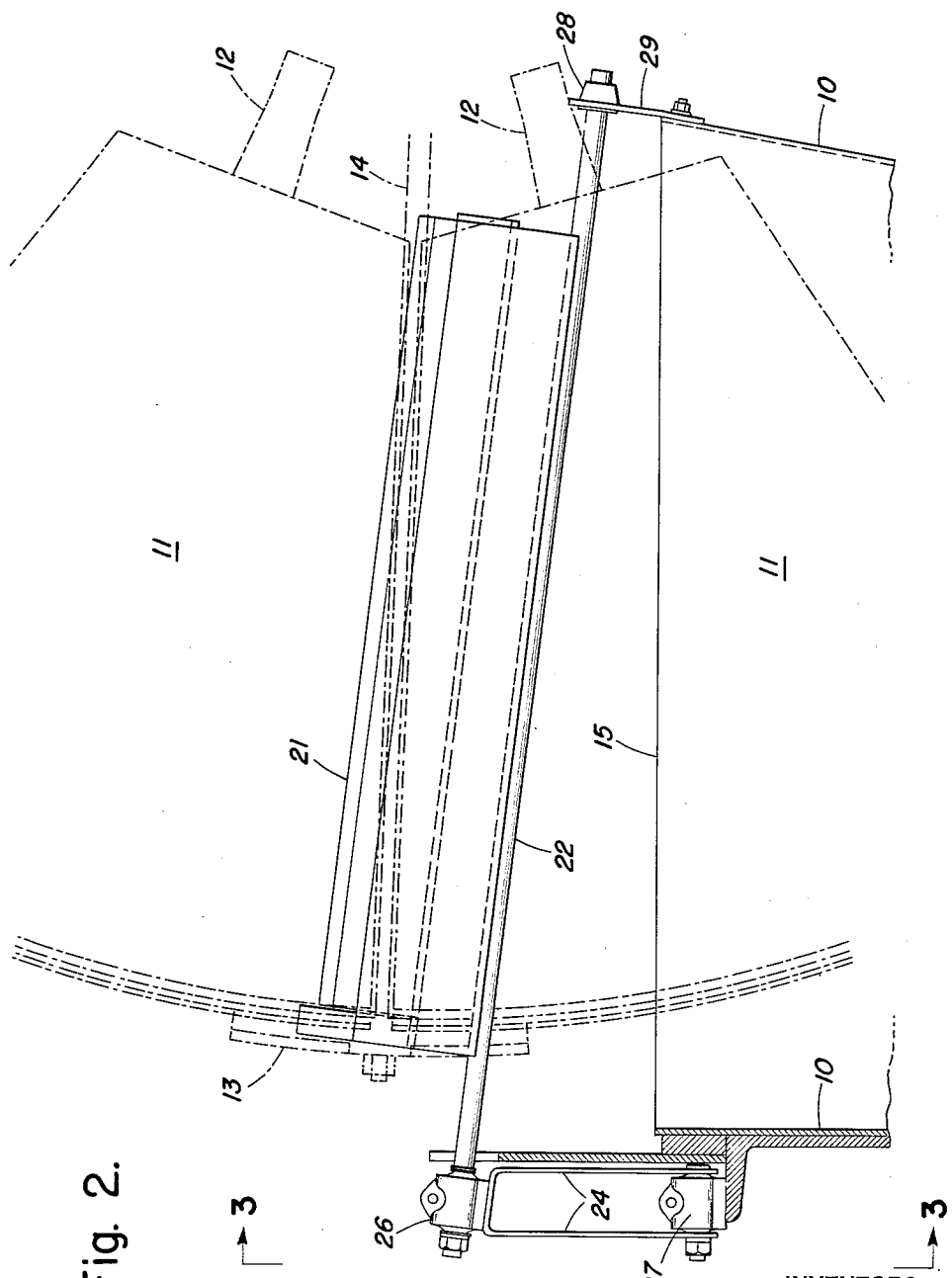

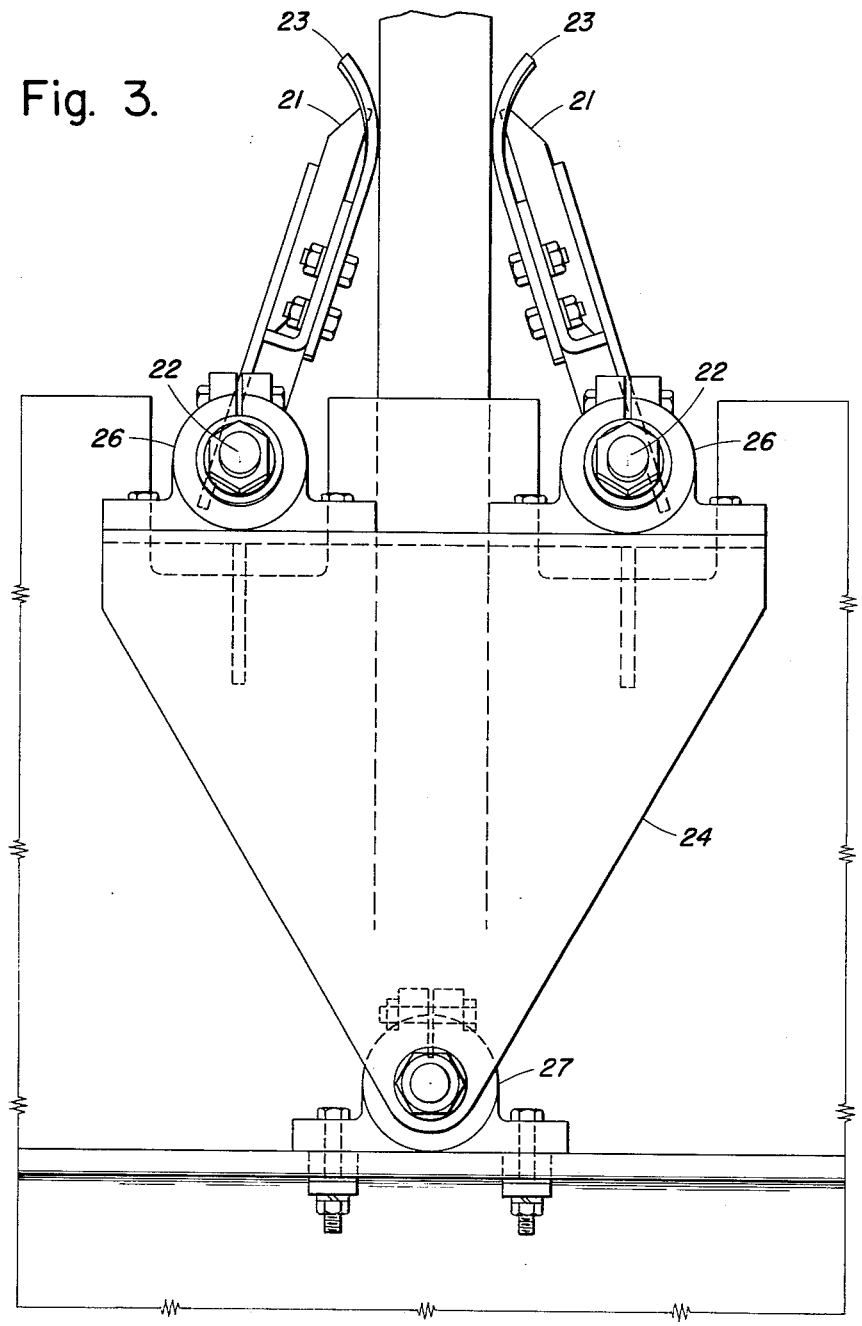

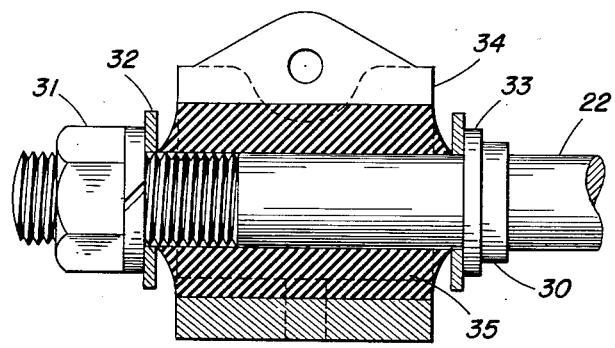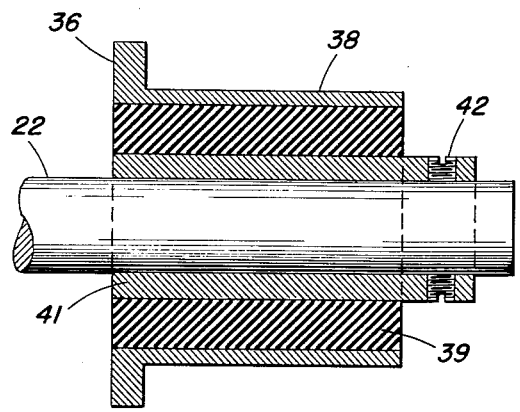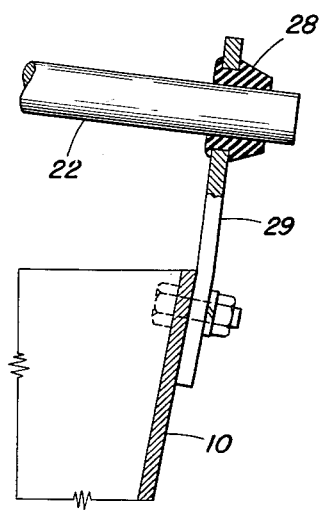

United States Patent Office 2,974,802
Patented Mar. 14, 1961

2,974,802

DISCHARGE BLADES FOR ROTARY FILTERS

Charles R. Morehouse, Alameda, and Julian B. Booth, Jr., Castro Valley, Calif., assignors to Dorr-Oliver Incorporated, Stamford, Conn., a corporation of Delaware Filed Nov. 12, 1958, Ser. No. 773,257

6 Claims. (Cl. 210—396)

This invention relates to improved means for discharging filter cake from continuous rotary filters. More particularly, this invention relates to improved means for mounting filter cake discharge blades on continuous rotary disc filters of a type illustrated, for example, in U.S. Letters Patent 1,259,139.

In the operation of rotary disc filters, a filter cake discharge blade is utilized to remove filter cake from the rotating disc sector cover. After the accumulated filter cake has been loosened by the blowback of air through the covers, the filter cake discharge blades serve to scrape the remaining cake from the covers and deflect the loosened filter cake into a suitable discharge receptacle.

To insure efficient removal of the filter cake, the cake discharge blade should be maintained at a fixed and proper distance from the rotating disc sectors. Unfortunately, variations in the alignment of the several disc sectors cannot be avoided and some amount of wobble will result during their rotation. For this reason it is extremely desirable to utilize a yieldably mounted cake discharge blade which can accommodate for and follow the erratic lateral movements of the rotating filter disc sectors.

It is, therefore, an object of this invention to provide improved means for yieldably mounting filter cake discharge blades on rotary disc type filters to enable such blades to accommodate for and follow variations in the alignment of the several filter disc sectors.

A further object of this invention is to provide improved means for mounting filter cake discharge blades whereby such blades laterally position themselves at a fixed distance from each of the several rotating filter disc sectors.

Yet another object of this invention is to provide an improved mounting means for cake discharge blades on rotary disc type filters which means are not subject to fouling by accretions of cake splatter.

Briefly, the objects of this invention are achieved by mounting the cake discharge blades on support rods that are yieldably mounted in rubber torsion bearings. These rubber torsion bearings, located at the several ends of the support rods, act in cooperation with guide clips to hold the cake discharge blades in a fixed position relative to the surface of the filter sectors while enabling lateral movement of the scraping blades to accommodate for variations in the alignment of adjacent filter sectors.

While the present invention will now be described with particular reference to rotary disc filters, it is understood that this invention may be readily adapted for use in association with other conventional rotary type filters.

In the drawings:

Figure 2 is a view of this invention in side elevation.

Figure 3 is a front elevation taken along section line 3—3 of Figure 2.

Figure 4 is a view partially in cross section illustrating a rubber grommet for use on the blade support rods at their inner ends.

Figure 5 is a view partially in cross section of another embodiment of a rubber torsion bearing.

Figure 6 is a view partially in cross section of still another embodiment of a rubber torsion bearing.

Figure 1:
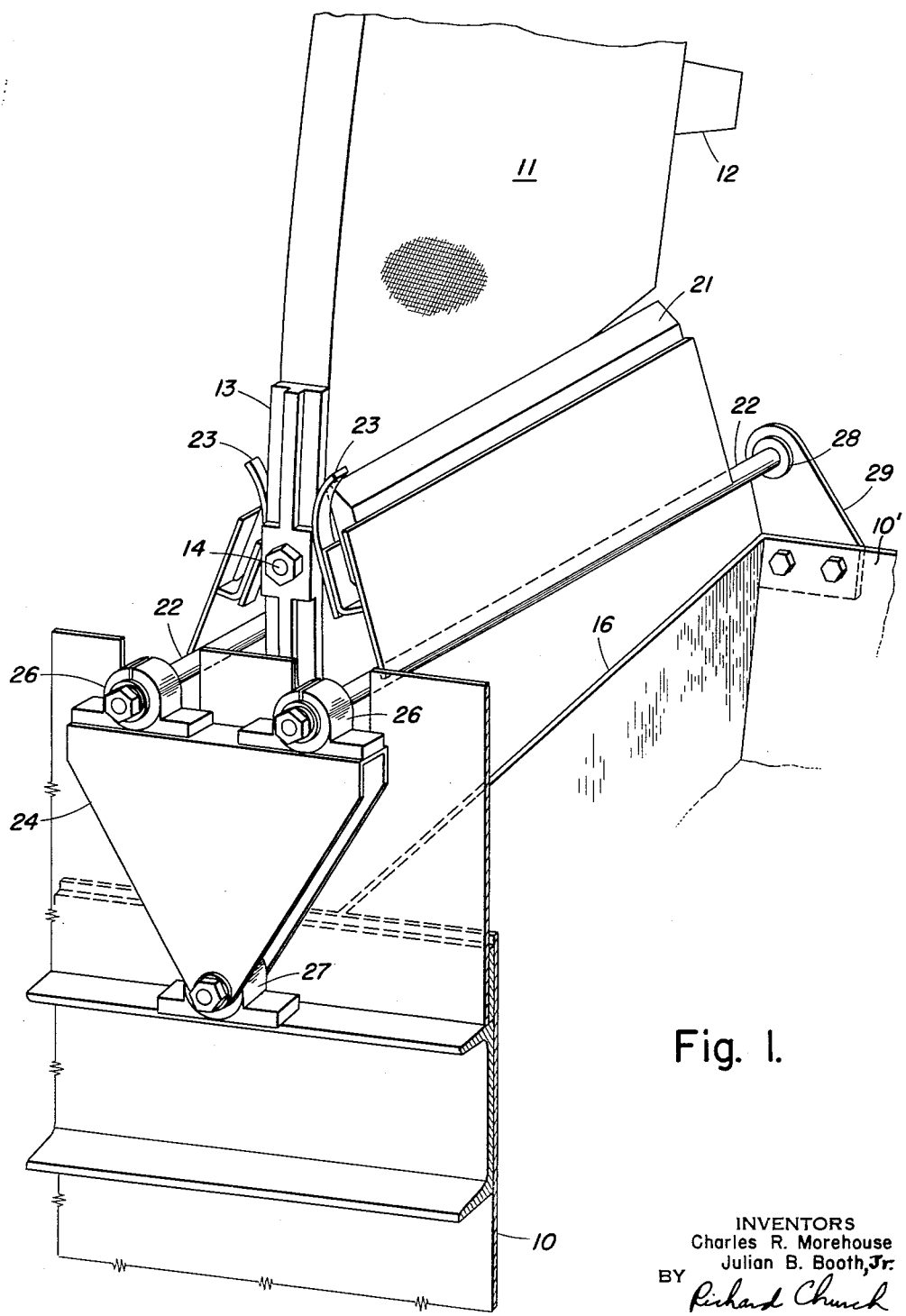
Figure 1 is a view in perspective of a preferred embodiment of this invention.

Referring to the drawings, there is generally illustrated in Figures 1 and 2 a partial view of a rotary disc type filter which is provided with cake discharge blades mounted in accordance with this invention. Filter disc sectors 11 are radially positioned about a central shaft, not shown herein. Straps 13 and radial tie rods 14 position and secure the disc sectors 11. Drainage nipples 12 on the inner circumference of disc sectors 11 are adapted to be received by the central shaft. While not shown herein, it should be understood that a series of filter disc units are positioned about the central shaft, thus providing a plurality of filter elements in but a single unit.

Cake discharge blades 21 are positioned to extend in a generally radial direction entirely across the faces of the disc sectors rotated therebetween. The discharge blades 21 are held by support rods 22 and the rods are in turn supported at their outer ends by rubber torsion bearings 26 and at their inner ends by rubber grommets 28. Alternatively, the support rods may be held at their inner ends by rubber torsion bearings. Guide clips 23 are provided at the outer ends of the cake discharge blades 21.

Inner rubber grommet 28 is held by a bracket 29 that is rigidly attached to the inner sidewall 10' of the filter tank. A rubber torsion bearing 27 is mounted on the outer sidewall 10 of the filter tank to support a generally triangular yoke structure 24. It will be noted that the yoke 24 is positioned base upwards and is carried, at its apex, by the single torsion bearing 27. Torsion bearings 26, which hold the blade support rod 22, are mounted on the base of yoke 24.

The central shaft contains a plurality of conduits extending substantially the length of the central shaft. One such conduit is provided for each of the filter disc sectors on a given filter unit. The interior of the disc sectors are in communication with the conduits by way of drainage nipples 12 which are attached in sealing relationship to the conduits. By means of a suitable valving arrangement located at the axial extent of the conduits, either a vacuum or pressure may be alternatively applied within the disc sectors.

In operation the central shaft is turned and the filter discs placed in continuous rotation. In a typical cycle of operation the filter disc sectors are rotated into the slurry tank (not shown except for side walls 10 and 10') and submerged in the slurry to be filtered. The filter disc sectors are placed under vacuum and a clarified filtrate is drawn through the cloth disc covers and into the disc sectors while solid material is deposited as a cake on the disc covers. As the rotation continues, the disc sectors are withdrawn from the slurry tank. The vacuum is maintained in order to remove as much of the liquid from the filter cake as possible. If desired, a washing sequence may ensue in which the filter cake is passed under a shower of wash liquid. The vacuum is then discontinued and a pressure is applied within the disc sectors. This blow back forces the disc covers surrounding the disc sectors away from the sector faces and loosens the filter cake preparatory to discharge.

The filter disc sectors have now moved into position for the discharge blades 21 to engage the surface of the filter cover. The filter cake is scraped from its surface and directed over wall 16 to discharge.

The discharge blades 21 are aligned before the filter is placed in operation by loosening the torsion bearings 26 and positioning the guide clips snugly against the peripheral surface of the disc sectors. The torsion bearings are then tightened. As the filter disc sectors rotate, the guide clips follow the erratic lateral movement of the several disc sectors and maintain the discharge blades at the preset distance from the face of the filter disc sectors. The torsion bearings provide an effectual spring bias which keeps the spring clips 23 seated against the disc sectors.

As can best be seen in Figure 3, motion is also transmitted from one of a pair of discharge blades to the other blade through the yoke 24 to coordinate their respective movements. Thus a lateral movement of a disc sector towards one of the discharge blades causes a corresponding following movement of the discharge blade located on the opposite face of the disc sector. While the preferred embodiment of this invention includes the use of this yoke 24, it must be understood that it is within the scope of this invention to mount the torsion bearings 26 independently.

With specific reference to Figures 4, 5 and 6, details of rubber torsion mountings suitable for use in conjunction with this invention are illustrated. It can be seen in the embodiment shown in Figure 5 that blade support rod 22 has a raised portion 30 which accommodates a washer 33. Nut 31 cooperating with washer 32 will, when advanced along shaft 22, cause washer 32 to exert a force against a rubber insert 35 which, in turn, is restrained from motion along shaft 22 by washer 33 and the raised portion of shaft 22 at point 30. As rubber insert 35 is surrounded by metal housing 34, it is constrained from movement in all directions and must necessarily seat firmly against the shaft 22. Thus, shaft 22 is firmly but yieldably held within this mounting.

In Figure 6 there is shown another embodiment of a rubber torsion bearing. This bearing is particularly suitable for use at the inner end of the blade support. In this modification a rubber insert is bonded to an outer metal housing 38 and a hollow cylindrical concentric metal insert 41. The cylindrical insert is provided with set screws 42 which engage and hold the blade support 22 when it is inserted into the torsion bearing. A flange is provided on the housing 38 to engage the support member 29 when the body of the bearing is positioned in the hole in member 29.

Alternatively, it may not be necessary to mount the inner end of the blade support 22 in a torsion bearing and a simple rubber grommet, as shown in Figure 4, may suffice.

From the foregoing it may be seen that effectual means are provided whereby the discharge blades on rotary disc type filters are at all times accurately positioned for maximum effectiveness in removing filter cake despite misalignment and erratic lateral movements of the several disc sectors. Further, these means are simply installed; they require no maintenance as there is no metal to metal sliding or rotating contact; and they are not subject to becoming fouled by accretions of cake splatter.

We claim:

1. A cake discharge blade construction for a rotary filter disc in disc type filters, comprising a pair of cake discharge blades located opposite each other and resiliently urged against respective sides of said filter disc rotatable about a horizontal axis, each said blade having an inner end adjacent the axis of rotation of the disc and an outer end adjacent to the periphery of the disc; bearing means for mounting said blades each tiltable about a tilting axis to allow the blades to accommodate irregularities of the disc, comprising rear bearing means at the inner end of each blade adapted to allow for angular displacement of the respective tilting axis, outer bearing means at the outer end of each blade also adapted to allow for angular displacement of the tilting axis; a common upright supporting structure for both said outer bearing means; and foot bearing means for movably supporting said common structure adapted to allow for angular displacement thereof about a tilting axis substantially coextensive with the tilting axis of the blades.

2. A cake discharge blade construction for a rotary filter disc in disc type filters comprising, a pair of cake discharge blades located opposite each other and resiliently urged against respective sides of said filter disc rotatable about a horizontal axis, each said blade having an inner end adjacent to the axis of rotation and an outer end adjacent to the periphery of the disc; bearing means for pivotally mounting said blades each tiltable about a tilting axis to allow the blades to accommodate irregularities of the disc, comprising rear bearing means at the inner end of each blade adapted to allow for angular displacement of the respective tilting axis, outer bearing means at the outer end of each blade also adapted to allow for angular displacement of the tilting axis, a common upright supporting structure for both said outer bearing means, and foot bearing means comprising a rubber torsion bearing for movably supporting said common structure adapted to allow for angular displacement thereof about a tilting axis substantially co-extensive with the tilting axes of the blades.

3. A cake discharge blade construction for a rotary filter disc in disc type filters comprising, a pair of cake discharge blades located opposite each other relative to said filter disc rotatable about a horizontal axis, each said blade having an inner end adjacent to the axis of rotation and an outer end adjacent to the periphery of the disc, bearing means for pivotally mounting said blades each tiltable about a tilting axis to allow the blades to accommodate irregularities of the disc, comprising rear bearing means at the inner end of each blade to allow for angular displacement of the respective tilting axis, rubber torsion bearing means at the outer end of at least one of said blades adapted to resiliently urge the blades against the disc, a common upright supporting structure for both said outer bearing means, and foot bearing means for movably supporting said common structure adapted to allow for angular displacement thereof.

4. A cake discharge blade construction for a rotary filter disc in disc type filters comprising, a pair of cake discharge blades located opposite each other relative to said filter disc rotatable about a horizontal axis, each said blade having an inner end adjacent to the axis of rotation and an outer end adjacent to the periphery of the disc, bearing means for pivotally mounting said blades each tiltable about a tilting axis to allow the blades to accommodate irregularities of the disc, comprising rear bearing means at the inner end of each blade to allow for angular displacement of the respective tilting axis at least one of which rear bearing means is a rubber bearing, rubber torsion bearing means at the outer end of at least one of said blades adapted to resiliently urge the blades against the disc, a common upright supporting structure for both said outer bearing means, and foot bearing means for movably supporting said common structure adapted to allow for angular displacement thereof.

5. A cake discharge blade construction for a rotary filter disc in disc type filters comprising, a pair of cake discharge blades located opposite each other relative to said filter disc rotatable about a horizontal axis, each said blade having an inner end adjacent to the axis of rotation and an outer end adjacent to the periphery of the disc, bearing means for pivotally mounting said blades each tiltable about a tilting axis to allow the blades to accommodate irregularities of the disc, comprising rear bearing means at the inner end of each blade to allow for angular displacement of the respective tilting axis at least one of which rear bearing means is in the form of a rubber grommet, rubber torsion bearing means at the outer end of at least one of said blades adapted to resiliently urge the blades against the disc, a common upright supporting structure for both said outer bearing means, and foot bearing means for movably supporting said common structure adapted to allow for angular displacement thereof.

6. A cake discharge blade construction for a rotary filter disc in disc type filters comprising, a pair of cake discharge blades located opposite each other relative to said filter disc rotatable about a horizontal axis, each said blade having an inner end adjacent to the axis of rotation and an outer end adjacent to the periphery of the disc, bearing means for pivotally mounting said blades each tiltable about a tilting axis to allow the blades to accommodate irregularities of the disc, comprising rear bearing means at the inner end of each blade to allow for angular displacement of the respective tilting axis, rubber torsion bearing means at the outer end of at least one of said blades adapted to resiliently urge the blades against the disc, a common upright supporting structure for both said outer bearing means, and foot bearing means in the form of a rubber torsion bearing for movably supporting said common structure adapted to allow for angular displacement thereof.

References Cited in the file of this patent

UNITED STATES PATENTS

| | | |
|---|---|---|
| 2,042,308 | Hardy | May 26, 1936 |
| 2,669,360 | Little | Feb. 16, 1954 |
| 2,684,845 | Moulton | July 27, 1954 |
| 2,824,734 | Linn et al. | Feb. 25, 1958 |
| 2,885,083 | Peterson et al. | May 5, 1959 |